(12) United States Patent
Ferguson et al.

(10) Patent No.: US 10,844,712 B2
(45) Date of Patent: Nov. 24, 2020

(54) DEVICES AND METHODS FOR MEASURING ANALYTE CONCENTRATION

(71) Applicant: Schlumberger Technology Corporation, Sugar Land, TX (US)

(72) Inventors: Richard Ferguson, Shibuya-ku (JP);
Gary Martin Oddie, St. Neots (GB);
Nathan Lawrence, Huntingdon (GB);
Andrew Meredith, Cambridge (GB);
Laurent Pirolli, Stafford, TX (US);
Emma Irene Corcoran, Royston (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 225 days.

(21) Appl. No.: 14/818,306

(22) Filed: Aug. 5, 2015

(65) Prior Publication Data

US 2016/0041120 A1 Feb. 11, 2016

Related U.S. Application Data

(60) Provisional application No. 62/036,098, filed on Aug. 11, 2014.

(51) Int. Cl.
*E21B 49/08* (2006.01)

(52) U.S. Cl.
CPC ........ *E21B 49/087* (2013.01); *E21B 49/0875* (2020.05)

(58) Field of Classification Search
CPC .... B01J 19/00; E21B 47/06; E21B 2049/085; E21B 49/08–10
See application file for complete search history.

(56) References Cited

U.S. PATENT DOCUMENTS

| | | | | |
|---|---|---|---|---|
| 2003/0134426 | A1* | 7/2003 | Jiang | E21B 47/011 436/121 |
| 2004/0026076 | A1* | 2/2004 | Goodwin | E21B 34/08 166/66.6 |
| 2004/0045350 | A1* | 3/2004 | Jones | E21B 43/38 73/152.23 |
| 2005/0241382 | A1* | 11/2005 | Coenen | E21B 49/005 73/152.19 |
| 2009/0293605 | A1* | 12/2009 | Evrard | E21B 49/005 73/152.25 |
| 2012/0137764 | A1* | 6/2012 | Lawrence | E21B 49/005 73/152.23 |
| 2013/0075093 | A1* | 3/2013 | van Hal | E21B 49/081 166/264 |

OTHER PUBLICATIONS

Tobias Metz, Nils Paust, Roland Zengerle, Peter Koltay, "Capillary driven movement of gas bubbles in tapered structures," Microfluid Nanofluid (2010) 9:341-355.

* cited by examiner

*Primary Examiner* — Maris R Kessel
(74) *Attorney, Agent, or Firm* — Eileen Pape (57) ABSTRACT

Provided herein are devices and methods for reducing the negative effects of bubble formation on the detection, quantification and/or monitoring of analytes.

20 Claims, 6 Drawing Sheets

DEVICES AND METHODS FOR MEASURING ANALYTE CONCENTRATION

CROSS-REFERENCE TO RELATED APPLICATIONS

The present document is based on and claims priority to U.S. Provisional Application Ser. No.: 62/036098, Devices and Methods for Measuring Analyte Concentration, filed Aug. 11, 2014, which is incorporated herein by reference in its entirety.

TECHNICAL FIELD

The subject matter disclosed herein generally relates to devices and methods for reducing the negative effects of bubble formation on the detection, quantification and/or monitoring of analytes. The systems and methods can be used, for example, to monitor gases downhole in a well.

BACKGROUND

In a downhole sampling tool, the flowline may experience significant pressure changes over short timescales of several Kpsi. Any sensor contained within this flowline will therefore also be exposed to such pressure cycles. When a gas permeable membrane is used there may be situations where the pressure change outside the sensor in the flowline is so rapid that gas cannot permeate through the membrane fast enough and as such gas may evolve into the system as a bubble rather than remain dissolved in solution. If this happens, the effect of bubble formation may be significant on the measurement being undertaken. Accordingly, there is a need in the art to provide devices and methods for reducing the negative effects of bubble formation in the monitoring of analytes.

SUMMARY

Provided herein are devices and methods for reducing the negative effects of bubble formation on the detection, quantification and/or monitoring of analytes.

Suitable devices can comprise a membrane that allows diffusion of an analyte. The device can further comprise an active measuring area for measuring a concentration of the analyte. The device can further comprise a sensing chamber situated between the membrane and the active measuring area. The sensing chamber can include a wall and can comprise a mediating fluid. The device can further comprise an element for reducing and/or accounting for bubble formation in the sensing chamber to thereby reduce the negative effect that bubble formation has on accurately measuring the analyte concentration.

In some examples, the device comprises an electrochemical device. The active measuring area of the electrochemical device can comprise, for example, a working electrode for measuring the concentration of the analyte. The electrochemical device can further comprise a counter electrode. The element, for example, can comprise a current limiter that can prevent excess current from passing between the working electrode and the counter electrode. In some examples, the electrochemical device can further comprise a reference electrode in contact with the mediator fluid.

In some examples, the element for reducing bubble formation comprises a valve that can be closed to isolate the device from a downhole stream such as a flowline when significant pressure fluctuations occur in the downhole stream. The device, for example, can further comprise a pressure sensor for measuring the pressure differential between the sensing chamber and a downhole fluid. The pressure sensor can communicate with a controller that can, for example, close the valve to isolate the sensor and/or stop the measurement of the analyte concentration when the pressure differential is above a predetermined level.

In some examples, the element for reducing bubble formation comprises means for flushing the bubbles from the sensing chamber. For example, the sensing device can include a reservoir of fresh mediator fluid in communication with the sensing chamber, wherein the reservoir of fresh mediator fluid is capable of being flushed through the sensing chamber to remove bubbles in the sensing chamber. In some examples, removing bubbles from the sensing chamber comprises burping the bubbles from the mediator fluid. For example, a solenoid valve can be used to remove bubbles from the mediator fluid.

In some examples, the element for reducing the negative effects of bubble formation comprises a support component that provides rigidification to the membrane. For example, the support component can include a beam that extends across the surface of the membrane. In some examples, the element for reducing bubble formation comprises a coating such as PTFE for reducing the number of bubble nucleation sites on the interior surface of the sensing chamber.

In some examples, the element for reducing bubble formation can comprise a shaped element in the sensing chamber to direct bubble away from the active measuring area. The shaped element can, for example, comprise a wedge shaped element or a dome shaped element.

Also disclosed herein are methods of measuring an analyte concentration in a downhole stream. The method can comprise providing a device. The device can comprise any of the devices described herein. In some examples, the method further comprises measuring the analyte concentration adjacent the active measuring area.

The method can, for example, further comprise measuring the pressure of the downhole stream. When the pressure of the downhole steam exceeds a predetermined value, the method can further comprise, for example, closing a valve to isolate the sensing device from the downhole stream and/or stopping the measurement of the analyte concentration.

In some examples, the number of bubble nucleation sites in the sensing chamber can be reduced. For example, a coating can be used to reduce the number of bubble nucleation sites in the sensing chamber. The interior surface of the wall, for example, can be coated with the coating. The coating, for example, can comprise PTFE. In some examples, the interior surface of the wall of the sensing chamber can be rigidified thereby reducing the number of bubble nucleation sites on the interior surface of the sensing chamber. In some examples, the membrane can be rigidified. For example, an additional support structure can be used to rigidify the membrane. In some examples, the interior surface of the wall of the sensing chamber can be coated to reduce the number of bubble nucleation sites on the interior surface of the sensing chamber.

In some examples, the method can include removing bubbles from the sensing chamber. For example, the step of removing bubbles from the sensing chamber can include flushing fresh mediator fluid through the sensing chamber to remove bubbles from the sensing chamber. Alternatively, the step of removing bubbles from the sensing chamber can include burping the bubbles from the mediator fluid.

The description below sets forth details of one or more embodiments of the present disclosure. Other features, objects, and advantages will be apparent from the description, the drawings, and the claims.

BRIEF DESCRIPTION OF THE DRAWINGS

The accompanying figures, which are incorporated in and constitute a part of this specification, illustrate several aspects described below.

Like reference numbers and designations in the various drawings indicate like elements.

DETAILED DESCRIPTION

The present disclosure now will be described more fully hereinafter with reference to specific exemplary embodiments. Indeed, the present disclosure can be embodied in many different forms and should not be construed as limited to the embodiments set forth herein.

Provided herein are devices and methods for reducing the negative effects of bubble formation on the detection, quantification and/or monitoring of analytes. Downhole gas chemical sensors can use a gas permeable membrane to separate the sensing environment from the harsh/fouling media commonly found within an oilfield wellbore. Such a system can either operate in a flux mode in which the gas molecules passing through the membrane are reacted with and/or detected continuously, as in the case of an electrochemical Clark cell. In such systems rapid detection can be achieved as the detector is placed just behind the membrane. However, should the properties of the membrane alter during the course of the measurement, it could have a dramatic effect on the measurement as the output is proportional to the rate of transport through the membrane. To overcome these problems, the sensor can work in an alternative mode, which is known as an equilibrium measurement. In this case the gas is allowed to diffuse through the membrane into the sample chamber until the gas concentration within the sample chamber is in equilibrium with the external flowline. This measurement therefore negates any changes in the membrane properties (due to swelling or dehydration). However, another problem that can occur is the production of bubbles in the sample chamber, which can affect the diffusion of the analyte through the membrane and the measurement of the analyte by the electrode. These bubbles can be the result of variations in pressure, which can be common downhole.

Figure 1:
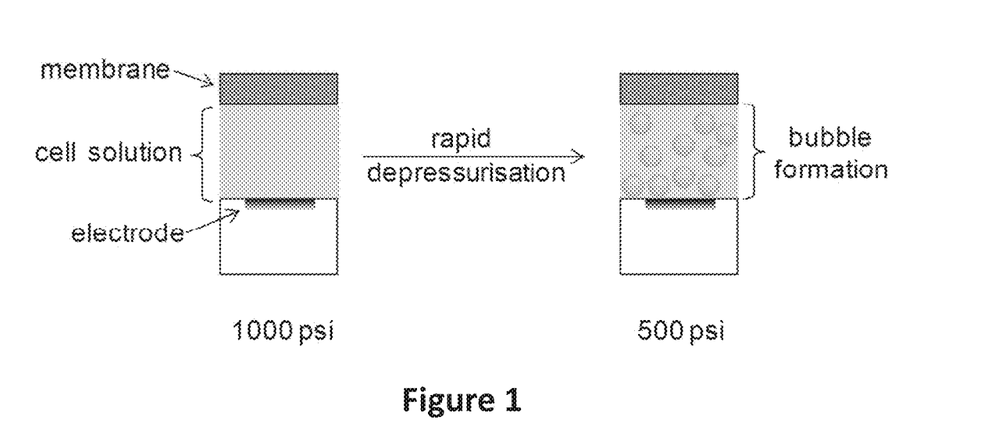
FIG. 1 displays an example of bubble growth resulting from the depressurization of a sensing chamber in a device.

As shown in FIG. 1, the depressurization of a mediating fluid even from 1000 psi to 500 psi can result in the evolution of gas bubbles resulting from gas coming out of the solution of the mediating fluid. In the example of an electrochemical downhole sensor, any bubble formation within the cell can negatively affect the measurement of the analyte by the electrode. Furthermore, in the case of a three electrode system (working, counter and reference) electrochemical system, there will be significant difficulties should the reference electrode be obscured. Obscuring the reference electrode could allow an uncontrolled potential to be passed through the working electrode. This would cause significant damage to the surface of the electrode and would require repolishing, which is not possible until the sensor is returned to surface.

This is also an issue for any sensor that utilizes a membrane separating a fluid to be interrogated from a sensing chamber containing a liquid. Such examples may include colorimetric sensors, where a bubble on an optical window will significantly influence the result of the measurement.

Described herein are a range of prevention and mitigation measures to help prevent bubble formation within the system and, in the event bubbles form, to either get rid of the bubbles or to account for these presence in the sensing chamber. Although means for reducing and/or accounting for bubble formation are described herein as discrete solutions, two or more of these means can be combined to address the issue of bubble formation in the devices described herein.

Figure 2:
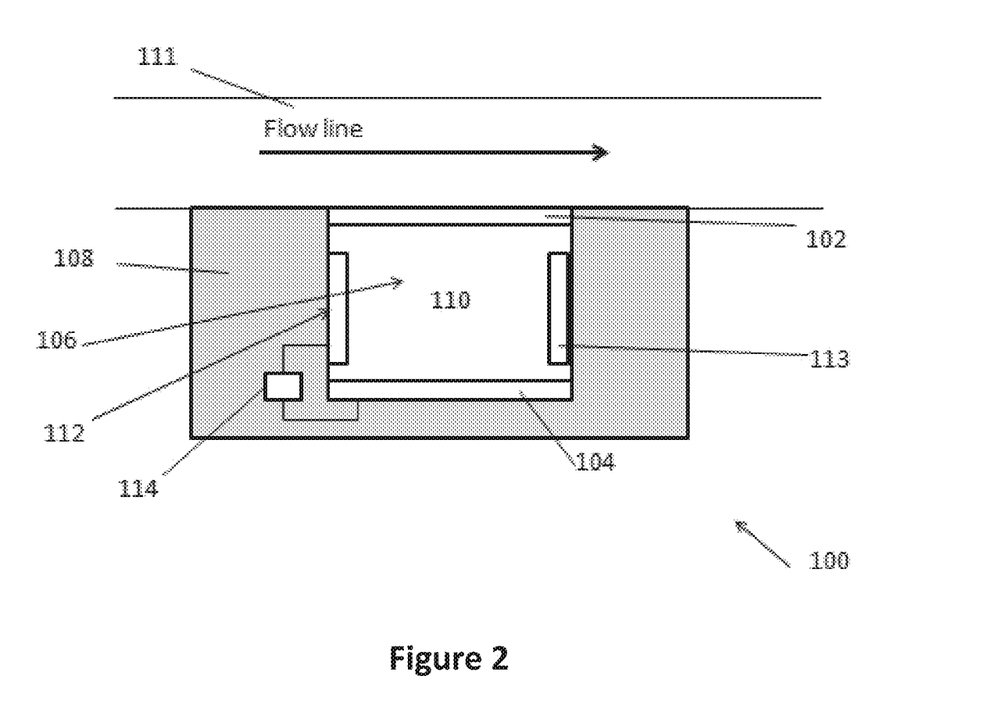
FIG. 2 displays a schematic representation of a suitable device including a current limiter.

Referring now to FIG. 2, suitable devices (100) such as sensors can comprise a membrane (102) that allows diffusion of an analyte. The analyte can be, for example, $H_2$, $H_2S$, $O_2$, $CO_2$, $CH_4$, $C_2H_6$, or a combination thereof. The device (100) can further comprise an active measuring area for measuring a concentration of the analyte, such as an electrode (104). The device (100) can further comprise a sensing chamber (106) situated between the membrane (102) and the electrode (104). As an example set of dimensions for the system, the device can be 10 mm in diameter and the distance between the electrodes (104) and the membrane (102) can be 0.5 mm.

The sensing chamber (106) can include a wall (108) and can comprise a mediating fluid (110). In some examples, the sensing chamber can be enclosed by the membrane (102), the electrode (104) and the wall (108). A flow line can include a stream (111) such as a downhole stream that can include the analyte and the analyte can diffuse from the stream through the membrane (102) into the mediating fluid (110). The device (100) can further comprise an element for reducing and/or accounting for bubble formation in the sensing chamber (106) to thereby reduce the negative effect that bubble formation has on accurately measuring the analyte concentration.

FIG. 2 illustrates an electrochemical device wherein the active measuring area is an electrode (104) such as a working electrode for measuring the concentration of the analyte. In some examples, the electrochemical device can further include a counter electrode (112) and a reference electrode (113) in contact with the mediator fluid. In some examples, the element can comprise a current limiter (114) that can prevent excess current from passing between the working electrode and the counter electrode. As a result, the current limiter (114) prevents an uncontrolled potential from being applied to the working electrode, which would end the measurement of the analyte.

Although not illustrated in FIG. 2, the device can comprise an optical device. For example, in an optical device, the electrode (104) can be replaced by a transparent material such as glass to allow for the optical measurement of an analyte therethrough.

Figure 3:
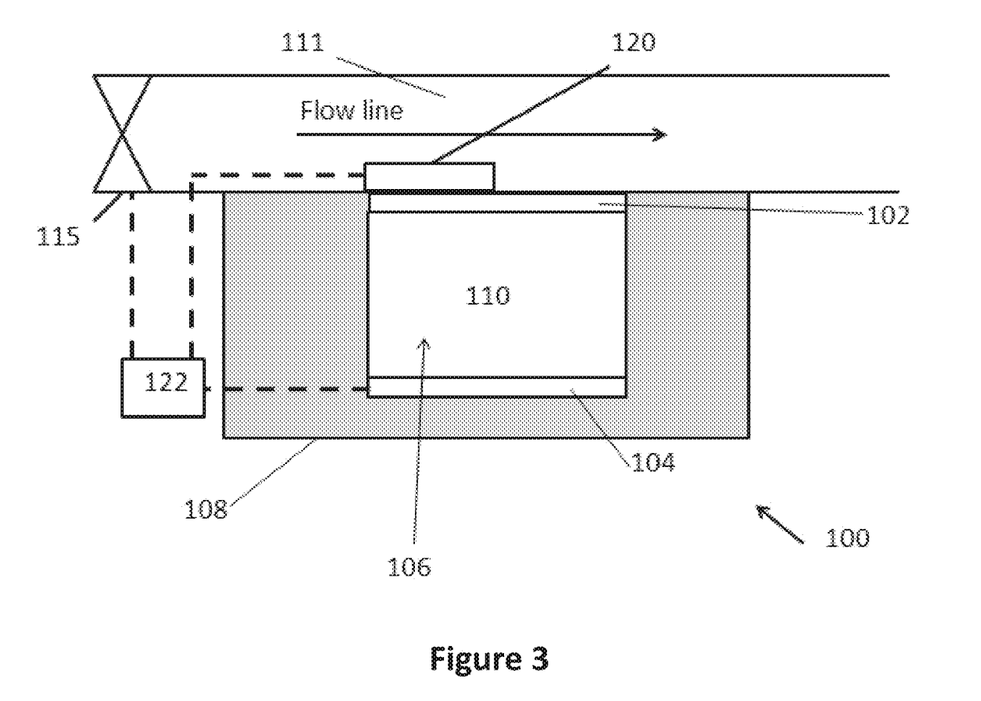
FIG. 3 displays a schematic representation of a suitable device including a sensor for measuring the differential pressure between the flow line and the sensing chamber and optionally including a valve to isolate the device from the flow line in the event the pressure is excessive.

Referring now to FIG. 3, in some examples the element for reducing bubble formation comprises a valve (115) that can be closed to isolate the device (100) from a downhole stream. For example, the device can be isolated from the downhole stream when significant pressure fluctuations occur in the downhole stream. In some examples, the device (100) can further comprise a pressure sensor (120) for measuring the pressure differential between the sensing chamber and a downhole fluid. The pressure sensor can communicate with a controller (122). The controller (122), for example, can be in communication with the active measuring area (104). The controller (122) can, for example, be capable of stopping the measurement of the analyte concentration when the pressure differential is above a predetermined level. Alternatively, the controller can be in communication with the valve (115) and can signal the valve (114) to close and isolate the device from the downhole stream (111) when the pressure differential is above a predetermined level.

Figure 4:
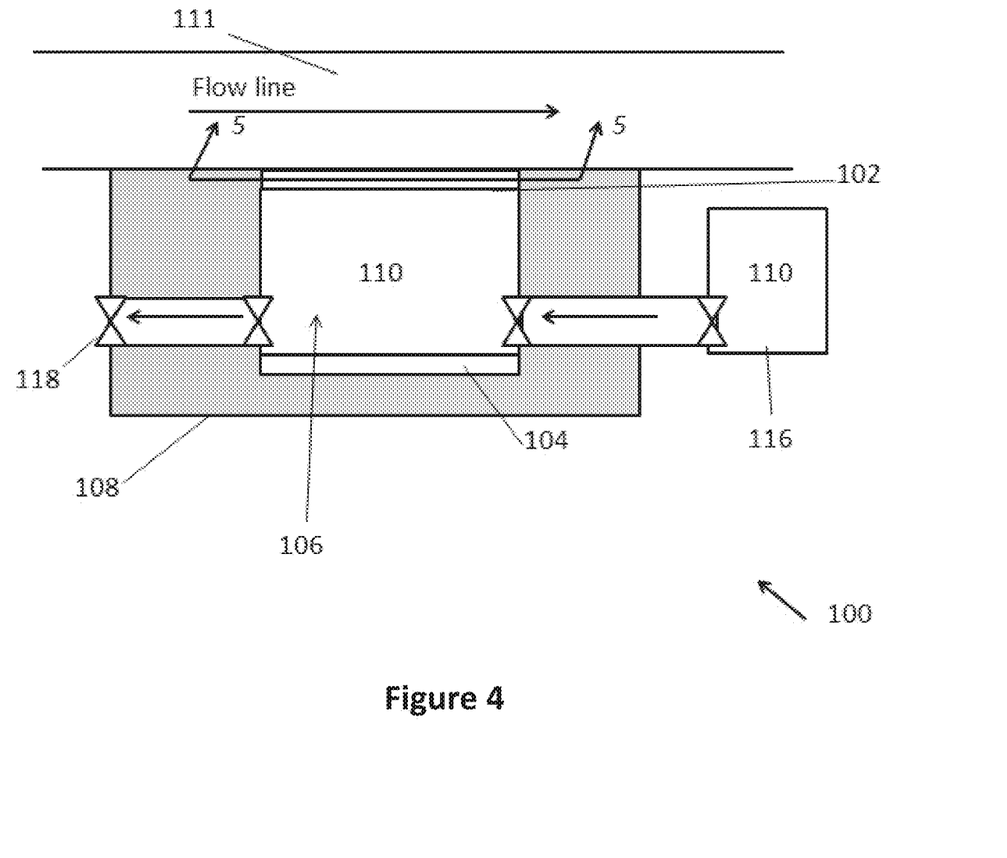
FIG. 4 displays a schematic representation of a suitable device including a reservoir with mediating fluid that can be used to flush the sensing chamber and a valve for burping bubbles from the sensing chamber.

In some examples, the element for reducing bubble formation comprises means for flushing the bubbles from the sensing chamber. Referring to FIG. 4, the sensing device (100) can further comprise a reservoir (116) of fresh mediator fluid (110) in communication with the sensing chamber (106). The reservoir (116) of fresh mediator fluid (110) can be flushed through the sensing chamber (106) to remove bubbles from the sensing chamber. In some examples, the device (100) can further comprise a valve (118) for burping the bubbles from the mediator fluid (110) of the sensing chamber (106). The valve (118) can, for example, comprise a solenoid valve.

Figure 5:
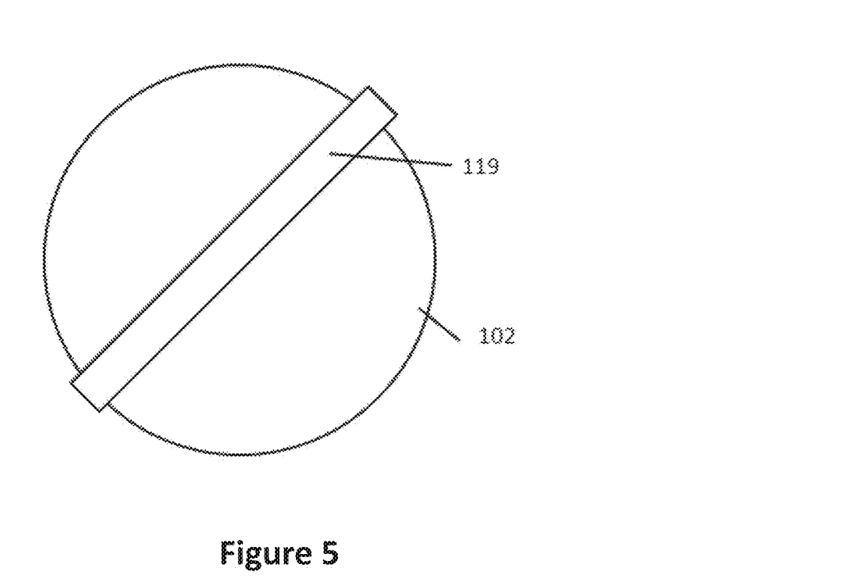
FIG. 5 displays a cross-sectional view along line 5-5 of FIG. 4 that illustrates a supporting beam for the membrane.

In some examples, the element for reducing the negative effects of bubble formation comprises a support component that provides rigidification to the membrane. For example, FIG. 5 is a cross-sectional view of the membrane (102) taken along line 5-5 of FIG. 4. As shown in FIG. 5, the support component, for example, can comprise a beam (119) that extends across a top surface of the membrane. Although one beam is illustrated in FIG. 5, more than one beam can be utilized as long as it does not substantially interfere with the diffusion of the analyte through the membrane and the subsequent measurement of the analyte. Alternatively, a rigid membrane can be used to prevent bubble formation.

Figure 6:
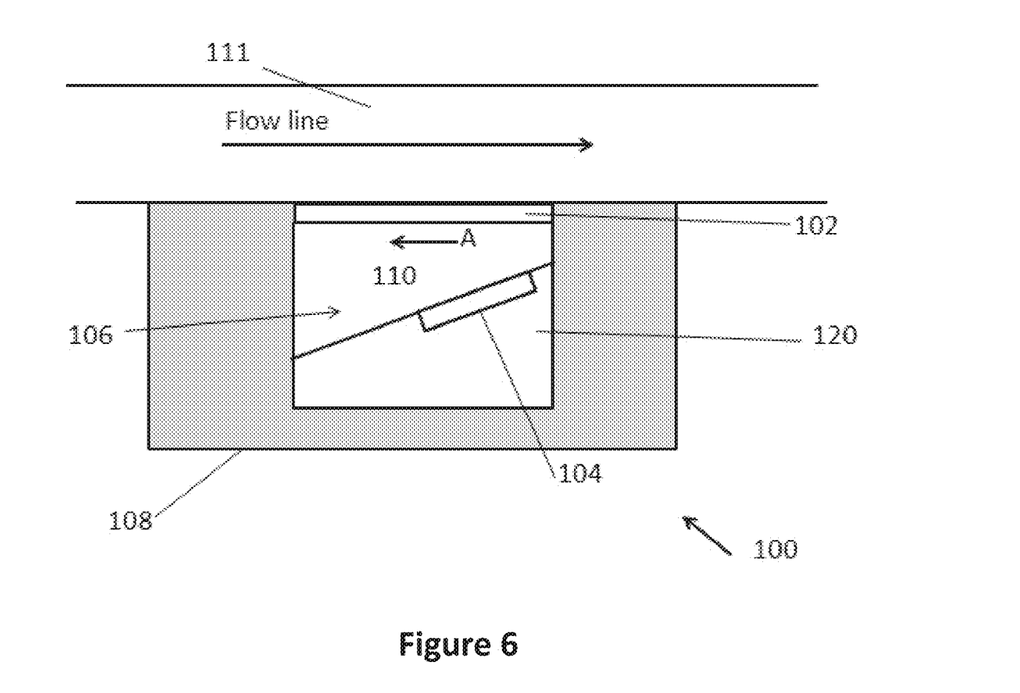
FIG. 6 displays a schematic representation of a suitable device including a wedge shaped element.
Figure 7:
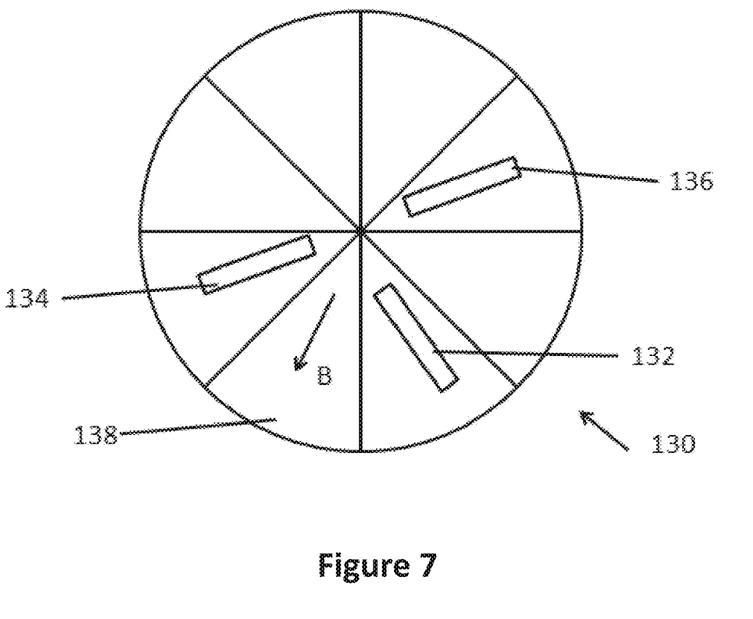
FIG. 7 displays a schematic representation of an electrode array having wedge shaped sections to limit the effect formed bubbles have on the measurement of the electrodes.
Figure 8:
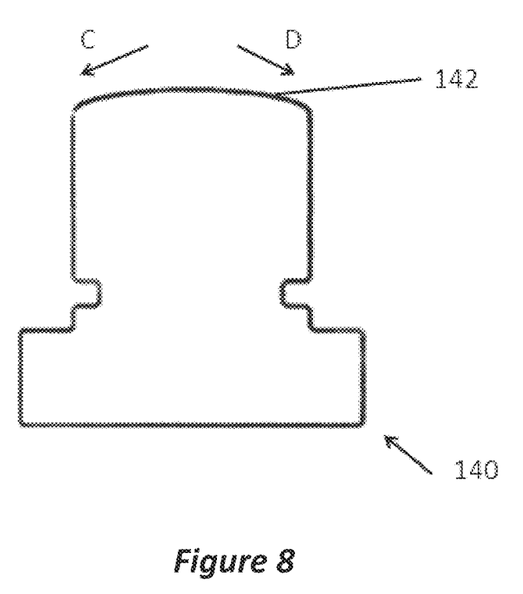
FIG. 8 displays a schematic representation of a domed shaped element for use in the devices described herein.

As shown in FIGS. 6-8, the element for reducing bubble formation can comprise a shaped element in the sensing chamber to direct bubbles away from the active measuring area. For example, as shown in FIG. 6, the shaped electrode can include an electrode (104) provided on a wedge shaped element (120). The wedge shape directs the bubbles in a direction (A) away from the electrode (104). As shown in FIG. 7, an electrode array (130) can be used in a sensor as described herein comprising a working electrode (132), a counter electrode (134), and optionally a reference electrode (136) provided within wedges in the electrode array. The other wedges can be porous areas that will facilitate the migration of the bubbles away from the center of the electrode array (130) and away from the electrodes. For example, bubbles can form in wedge (138) and can migrate in the direction (B) away from the electrodes (132, 134 and 136).

FIG. 8 illustrates a dome shaped element (140). The dome shaped element (140) can be used, for example, as a domed electrode bulkhead and can direct any bubbles away from the electrode(s) provided therein in the directions (C and D) and away from the electrode(s).

In some examples, the element for reducing bubble formation comprises a coating for reducing the number of bubble nucleation sites on the interior surface of the sensing chamber. The coating, for example, can be on the interior surface of the wall of the sensing chamber. The coating can comprise any material that is inert with respect to the mediating fluid and that reduces the coefficient of friction and/or the surface area on the inside of the sensing chamber to prevent the formation of bubble nucleation sites. For example, the coating can be polytetrafluoroethylene (PTFE), diamond like coating (DLC), polycrystalline diamond coating (PCD), or polyether ether ketone (PEEK).

In some examples, the wall of the sensing chamber can be rigidified to reduce the number of bubble nucleation sites on the interior surface of the sensing chamber. For example, the wall can be treated either thermally or chemically to increase its rigidity to reduce the number of bubble nucleating sites.

The device can be provided in any location where accurate measurement of an analyte is desired. For example, the device can be provided downhole in a well such as in a flowline having an upstream portion and a downstream portion. The terms "upstream" and "downstream" are used herein to indicate relative position as would be understood by one with ordinary skill in the art.

As used in the specification, and in the appended claims, the singular forms "a," "an," "the," include plural referents unless the context clearly dictates otherwise.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A downhole apparatus, comprising:
    a flowline having an upstream portion and a downstream portion;
    a sensing device located along the downstream portion of the flowline, the sensing device including:
        a membrane that allows diffusion of an analyte from a downhole stream of the flowline;
        an active measuring area for measuring a concentration of the analyte; and
        a sensing chamber situated between the membrane and the active measuring area, the sensing chamber including a wall and a mediating fluid, the mediating fluid to receive the analyte from the downhole stream via the membrane;
    a pressure sensor positioned along the downstream portion of the flowline, the pressure sensor to measure a pressure differential between the downhole stream and the sensing chamber;
    a valve operatively positioned between the upstream portion and the downstream portion of the flowline, the valve being actuatable between an open position that enables migration of the downhole stream from the upstream portion of the flowline to the downstream portion of the flowline, and a closed position that prevents migration of the downhole stream from the upstream portion of the flowline to the downstream portion of the flowline; and
    a controller operatively coupled to the pressure sensor and operatively coupled to the valve, the controller configured to generate a control signal in response to the measured pressure differential exceeding a predetermined level, the valve configured to move from the open position to the closed position in response to the control signal;
    wherein the controller is further operatively coupled to the active measuring area and configured to cease measuring the concentration of the analyte in response to the measured pressure differential exceeding the predetermined level.

2. The downhole apparatus of claim 1, wherein the sensing device comprises an electrochemical sensing device.

3. The downhole apparatus of claim 1, wherein the valve isolates the sensing device from the downhole stream when the valve is in the closed position.

4. The downhole apparatus of claim 1, wherein the sensing device comprises an optical sensing device.

5. The downhole apparatus of claim 1, wherein actuation of the valve from the open position to the closed position in response to the control signal reduces bubble formation within the sensing chamber.

6. The downhole apparatus of claim 1, wherein the active measuring area includes an electrode for measuring the concentration of the analyte.

7. The downhole apparatus of claim 6, wherein the electrode is oriented parallel to the membrane.

8. The downhole apparatus of claim 7, wherein the sensing chamber is enclosed by the membrane, the electrode, and the wall.

9. The downhole apparatus of claim 8, wherein the pressure sensor is positioned adjacent the membrane, and wherein the pressure sensor is oriented parallel to the membrane.

10. The downhole apparatus of claim 1, wherein the pressure sensor is positioned adjacent the membrane.

11. The downhole apparatus of claim 10, wherein the pressure sensor is oriented parallel to the membrane.

12. A method, comprising:
    diffusing an analyte from a downhole stream of a flowline via a membrane of a downhole sensing device, the flowline having an upstream portion and a downstream portion, the downhole sensing device located along the downstream portion of the flowline, the downhole sensing device including:
        an active measuring area for measuring a concentration of the analyte; and
        a sensing chamber situated between the membrane and the active measuring area, the sensing chamber including a wall and a mediating fluid, the mediating fluid to receive the analyte from the downhole stream via the membrane;
    measuring a pressure differential between the downhole stream and the sensing chamber via a pressure sensor positioned along the downstream portion of the flowline; and
    actuating a valve from an open position to a closed position in response to a control signal generated via a controller operatively coupled to the pressure sensor and operatively coupled to the valve, the controller generating the control signal in response to the measured pressure differential exceeding a predetermined level, the valve being operatively positioned between the upstream and downstream portions of the flowline, the valve enabling migration of the downhole stream from the upstream portion of the flowline to the downstream portion of the flowline when the valve is in the open position, the valve preventing migration of the downhole stream from the upstream portion of the flowline to the downstream portion of the flowline when the valve in in the closed position.

13. The method of claim 12, wherein actuating the valve from the open position to the closed position in response to the control signal reduces bubble formation within the sensing chamber.

14. The method of claim 13, wherein reducing bubble formation within the sensing chamber improves a measurement accuracy associated with data measured via the active measuring area.

15. The method of claim 12, wherein actuating the valve from the open position to the closed position in response to the control signal isolates the downhole sensing device from the downhole stream.

16. The method of claim 12, wherein the active measuring area includes an electrode for measuring the concentration of the analyte.

17. The method of claim 16, wherein the electrode is oriented parallel to the membrane.

18. The method of claim 12, wherein the controller is further operatively coupled to the active measuring area, and wherein the control signal is a first control signal, the method further comprising:
    generating a second control signal via the controller in response to the measured pressure differential exceeding the predetermined level; and
    ceasing measuring the concentration of the analyte via the active measuring area in response to the second control signal.

19. The method of claim 12, wherein the downhole sensing device comprises an electrochemical sensing device.

20. A downhole apparatus, comprising:
a flowline having an upstream portion and a downstream portion;
a sensing device located along the downstream portion of the flowline, the sensing device including:
  a membrane that allows diffusion of an analyte from a downhole stream of the flowline;
  an active measuring area for measuring a concentration of the analyte; and
  a sensing chamber situated between the membrane and the active measuring area, the sensing chamber including a wall and a mediating fluid, the mediating fluid to receive the analyte from the downhole stream via the membrane;
a pressure sensor positioned along the downstream portion of the flowline and adjacent the membrane, the pressure sensor to measure a pressure differential between the downhole stream and the sensing chamber;
a valve operatively positioned between the upstream portion and the downstream portion of the flowline, the valve being actuatable between an open position that enables migration of the downhole stream from the upstream portion of the flowline to the downstream portion of the flowline, and a closed position that prevents migration of the downhole stream from the upstream portion of the flowline to the downstream portion of the flowline; and
a controller operatively coupled to the pressure sensor and operatively coupled to the valve, the controller configured to generate a control signal in response to the measured pressure differential exceeding a predetermined level, the valve configured to move from the open position to the closed position in response to the control signal.

* * * * *